United States Patent
Kim

(10) Patent No.: US 9,522,678 B2
(45) Date of Patent: Dec. 20, 2016

(54) ADAPTIVE CRUISE CONTROL SYSTEM INTERLOCKING WITH LANE KEEPING ASSIST SYSTEM AND CONSTANT SPEED CONTROL METHOD THEREFOR

(71) Applicant: MANDO CORPORATION, Pyeongtaek-si, Gyeonggi-do (KR)

(72) Inventor: Hyun Wook Kim, Suwon-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 14/686,191

(22) Filed: Apr. 14, 2015

(65) Prior Publication Data

US 2015/0291163 A1    Oct. 15, 2015

(30) Foreign Application Priority Data

Apr. 14, 2014   (KR) ........................ 10-2014-0044130

(51) Int. Cl.
*B60W 30/12*   (2006.01)
*B60W 30/16*   (2012.01)

(52) U.S. Cl.
CPC .............. *B60W 30/16* (2013.01); *B60W 30/12* (2013.01); *B60W 2510/202* (2013.01); *B60W 2720/106* (2013.01)

(58) Field of Classification Search
CPC ..... B60W 30/12; B60W 30/16; B62D 15/025; B62D 5/008
USPC .................................................... 701/41, 96
See application file for complete search history.

(56) References Cited

U.S. PATENT DOCUMENTS

2011/0264329 A1*  10/2011  Limpibunterng ...... B62D 5/008
                                                       701/41
2015/0329108 A1*  11/2015  Kodaira ............... B62D 15/025
                                                       701/41

FOREIGN PATENT DOCUMENTS

| DE | 102011077975 A1 | 12/2012 |
| DE | 102012215060 A1 | 2/2014 |
| KR | 1020090062135 A | 6/2009 |
| KR | 1020120082602 A | 7/2012 |

OTHER PUBLICATIONS

German Office Action issued on May 19, 2016 in connection with the counterpart German Patent Application No. 102015206339.9.

* cited by examiner

*Primary Examiner* — Yuri Kan
(74) *Attorney, Agent, or Firm* — Hauptman Ham, LLP

(57) ABSTRACT

The adaptive cruise control system interlocking with the LKAS includes: a radar configured to detect a preceding vehicle ahead and measure an inter-vehicle distance; and an electronic control unit configured to control acceleration and deceleration of a vehicle according to a request acceleration calculated to maintain an appropriate distance from the preceding vehicle. The electronic control unit calculates a maximum request acceleration that is changed according to an auxiliary steering torque received from the LKAS which prevents lane departure and a change amount in the maximum request acceleration, and controls acceleration and deceleration of the vehicle based on a final request acceleration determined by using the calculated maximum request acceleration, the calculated change amount in the maximum request acceleration, and the calculated request acceleration.

5 Claims, 4 Drawing Sheets

ADAPTIVE CRUISE CONTROL SYSTEM INTERLOCKING WITH LANE KEEPING ASSIST SYSTEM AND CONSTANT SPEED CONTROL METHOD THEREFOR

CROSS-REFERENCE(S) TO RELATED APPLICATION

This application claims priority of Korean Patent Application No. 10-2014-0044130, filed on Apr. 14, 2014, in the Korean Intellectual Property Office, which is hereby incorporated by reference in its entirety.

BACKGROUND OF THE INVENTION

Field of the Invention

The present invention relates to an adaptive cruise control system interlocking with a lane keeping assist system (LKAS) and a constant speed control method therefor, and more particularly, to an adaptive cruise control system interlocking with an LKAS and a constant speed control method therefor, which control acceleration and deceleration of a vehicle according to a final request acceleration determined based on a request acceleration, to which an auxiliary steering torque received from the LKAS is reflected, a change amount in the request acceleration, and a request acceleration calculated to maintain an appropriate distance from vehicles ahead, thereby reducing a sense of incompatibility of a diver and archiving comfortable driving.

Description of the Related Art

More and more vehicles are equipped with a lane keeping assist system (hereinafter, referred to as an "LKAS") that generates an auxiliary steering force to improve a driver's convenience when a vehicle moves out of the vehicle's lane during driving using lane information from a camera and an adaptive cruise control system (hereinafter referred to as an "ACC system") that automatically maintains a vehicle speed and an inter-vehicle distance by detecting an object ahead of a vehicle using a forward detecting sensor, such as a radar or a camera, and automatically controlling an engine and a brake to improve a driver's convenience.

The LKAS is disclosed in Korean Patent Registration No. 1039722 or the like, and the ACC system is disclosed in Korean Patent Application Laid-Open No. 2012-82602 or the like.

However, the LKAS and the ACC system do not interlock with each other, and when LKAS and the ACC system are simultaneously driven, controls of the two systems are not performed organically, which causes a driver to feel a sense of incompatibility.

For example, in a case in which the LKAS provides an auxiliary steering torque when a vehicle begins to move out of its lane, when a preceding vehicle changes lanes and disappears in the front of the vehicle, or when a preceding vehicle accelerates, the ACC system is likely to give acceleration automatically. In this case, there are problems that a driver recognizes a vertical force and a horizontal force out of awareness and feels insecure, and since the vehicle accelerates in a state of being close to a neighboring lane, also feels a collision hazard to a vehicle in the neighboring lane.

There is a need for an ACC system capable of limiting acceleration/deceleration control so as to prevent a sense of incompatibility which a driver may feel when the auxiliary steering torque of the LKAS and the automatic acceleration of the ACC system are simultaneously generated upon lane departure.

CITATION LIST

Patent Literature (Patent Literature 1) Korean Patent Registration No. 1039722 (2011.03.01) entitled "LANE KEEPING ASSIST SYSTEM"

(Patent Literature 2) Korean Patent Application Laid-Open No. 2012-82602 entitled "ADAPTIVE CRUISE CONTROL SYSTEM AND CONTROL METHOD THEREFOR"

SUMMARY OF THE INVENTION

An aspect of the present invention is directed to an adaptive cruise control system interlocking with an LKAS and a constant speed control method therefor which control acceleration and deceleration of a vehicle according to a final request acceleration determined based on a request acceleration, to which an auxiliary steering torque received from the LKAS is reflected, a change amount in the request acceleration, and a request acceleration calculated to maintain an appropriate distance from a preceding vehicle, thereby reducing a sense of incompatibility of a driver and archiving comfortable driving.

According to an embodiment of the present invention, there is provided an adaptive cruise control system interlocking with a lane keeping assist system (LKAS), including: a radar configured to detect a preceding vehicle ahead and measure an inter-vehicle distance; and an electronic control unit configured to control acceleration and deceleration of a vehicle according to a request acceleration calculated to maintain an appropriate distance from the preceding vehicle, wherein the electronic control unit calculates a maximum request acceleration that is changed according to an auxiliary steering torque received from the LKAS which prevents lane departure and a change amount in the maximum request acceleration, and controls acceleration and deceleration of the vehicle based on a final request acceleration determined by using the calculated maximum request acceleration, the calculated change amount in the maximum request acceleration, and the calculated request acceleration The electronic control unit may include: a receiving unit configured to receive the auxiliary steering torque generated from the LKAS; a calculating unit configured to calculate the maximum request acceleration that is changed according to the auxiliary steering torque received from the receiving unit and the change amount in the maximum request acceleration; a determining unit configured to determine the final request acceleration by using the request acceleration which is calculated to maintain an appropriate distance from the preceding vehicle and to reflect a goal speed of a driver, and the maximum request acceleration and the change amount in the maximum request acceleration which are calculated by the calculating unit; and an acceleration/deceleration control executing unit configured to output a final request acceleration according to the final request acceleration determined by the determining unit and control acceleration and deceleration of the vehicle.

The final request acceleration may be determined to be a value obtained by adjusting the request acceleration by the change amount in the maximum request acceleration.

According to another embodiment of the present invention, there is provided a constant speed control method for an adaptive cruise control system interlocking with a lane keeping assist system (LKAS), the adaptive cruise control system including a radar configured to detect a preceding vehicle ahead and measure an inter-vehicle distance, and an electronic control unit configured to control acceleration and deceleration of a vehicle according to a request acceleration calculated to maintain an appropriate distance from the preceding vehicle, the constant speed control method including: receiving the auxiliary steering torque generated from the LKAS; calculating the maximum request acceleration that is changed according to the auxiliary steering torque received from the receiving unit and the change amount in the maximum request acceleration; and controlling acceleration and deceleration of the vehicle based on a final request acceleration determined by using the calculated maximum request acceleration, the calculated change amount in the maximum request acceleration, and the request acceleration calculated to maintain an appropriate distance from the preceding vehicle.

The controlling of the acceleration and deceleration of the vehicle may include determining the final request acceleration by using the request acceleration which is calculated to maintain an appropriate distance from the preceding vehicle and to reflect a goal speed of a driver, the calculated maximum request acceleration and the calculated change amount in the maximum request acceleration; and outputting a final request acceleration according to the determined final request acceleration determined and controlling acceleration and deceleration of the vehicle.

DETAILED DESCRIPTION OF EXEMPLARY EMBODIMENTS

Hereinafter, exemplary embodiments of the present invention will be described in detail with reference to the accompanying drawings.

Figure 1:
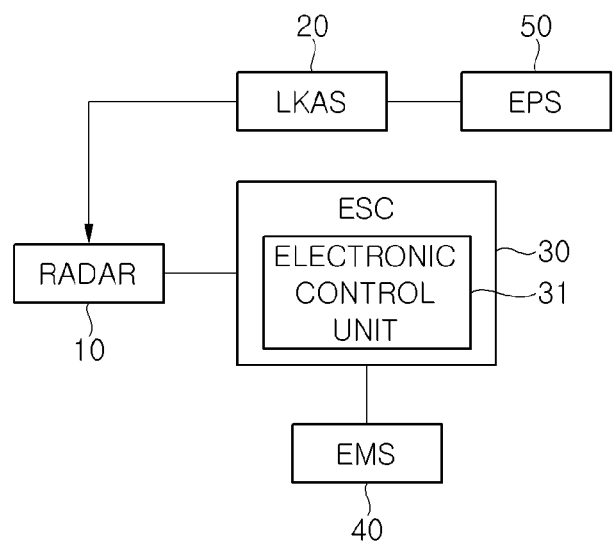
FIG. 1 is a diagram explaining an adaptive cruise control system interlocking with an LKAS according to an exemplary embodiment of the present invention.
Figure 2:
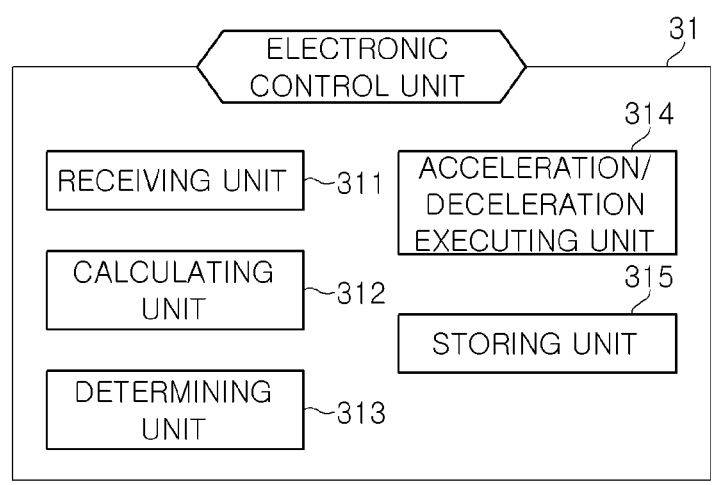
FIG. 2 is a block diagram explaining an electronic control unit of the adaptive cruise control system illustrated in FIG. 1.

FIG. 1 illustrates a diagram explaining an adaptive cruise control system interlocking with an LKAS according to an exemplary embodiment of the present invention, and FIG. 2 illustrates a block diagram explaining an electronic control unit of the adaptive cruise control system illustrated in FIG. 1.

Referring to FIG. 1, the adaptive cruise control system interlocking with an LKAS according to the exemplary embodiment of the present invention includes a radar 10 configured to detect a preceding vehicle ahead, an LKAS 20 configured to prevent lane departure when a host vehicle is traveling, and an electronic control unit 31 configured to control acceleration and deceleration of the vehicle while allowing the vehicle to maintain an appropriate distance from a preceding vehicle detected by the radar 10, by reflecting an auxiliary steering torque received from the LKAS 20. Although the electronic control unit 31 is described as being included in a brake control apparatus that is an electronic stability control (ESC) 30 in the exemplary embodiment, the electronic control unit 31 may be included in an engine control apparatus that is an engine management system (EMS) 40, or in the radar 10. When the electronic control unit 31 is included in the EMS 40, the EMS 40 has a structure electrically connected to the radar 10.

The radar 10 measures information on the preceding vehicle ahead and information on the host vehicle. Also, the radar 10 generates an acceleration command or a deceleration command based on the information on the preceding vehicle and the information on the host vehicle, and provides the generated acceleration command or deceleration command to the ESC 30 or provides the acceleration command to the EMS 40 or the deceleration command to the ESC 30.

The ESC 30 performs deceleration control according to the deceleration command received from the radar 10. When the acceleration command is received, the ESC 30 generates an engine-requested torque according to the acceleration command or the deceleration command and provides the generated engine-requested torque to the EMS 40. The EMS 40 may control an engine that converts combustion energy generated by combustion of fuel into kinetic energy. Although an oil-based vehicle is described as controlling an engine that converts combustion energy generated by combustion of fuel into kinetic energy in the present exemplary embodiment, the present invention is not limited thereto and it is obvious that the present invention is applicable to an electric vehicle or a hybrid vehicle. In particular, the ESC 30 receives the auxiliary steering torque generated from the LKAS 20 through the radar 10. The electronic control unit 31 included in the ESC 30 controls acceleration and deceleration of the vehicle according to the final request acceleration determined in consideration of the auxiliary steering torque received from the LKAS 20.

When the request acceleration is output as a command, the ACC system including the radar 10, the ESC 30, and the EMS 40 performs acceleration control or deceleration control such that a current acceleration is identical to the request acceleration. The amount or slope of the request acceleration is used as an important factor for acceleration control or deceleration control. Smooth acceleration or deceleration may be archived through adjustment of the amount and slope of the acceleration. When the amount of the maximum request acceleration is reduced, the vehicle accelerates at a low speed. When the slope is reduced based on a change amount in the maximum request acceleration, the driver feels a sense of smooth acceleration.

Referring to FIG. 2, an electronic control unit 31 includes a receiving unit 311, a calculating unit 312, a determining unit 313, an acceleration/deceleration control executing unit 314, a storing unit 315, and the like.

The receiving unit 311 may receive information on a preceding vehicle ahead and information on a host vehicle from the radar 10 and may further receive an acceleration command or a deceleration command. Also, the receiving unit 311 may receive a speed of a vehicle. The receiving unit 311 may receive an auxiliary steering torque generated from the LKAS 20.

The calculating unit 312 calculates a request acceleration to allow the host vehicle to maintain an appropriate distance based on the information on a preceding vehicle ahead and the information on a host vehicle, which are received from the receiving unit 311. In this case, the request acceleration is calculated by reflecting a goal speed of a driver.

Also, the calculating unit 312 calculates a maximum request acceleration that is changed according to an auxiliary steering torque received from the receiving unit 311 and a change amount in the maximum request acceleration.

The determining unit 313 determines a final request acceleration by using the maximum request acceleration and the change amount in the maximum request acceleration which are calculated by the calculating unit 312, and the request acceleration calculated to reflect the goal speed of the driver. The final request acceleration may be determined by using the following equation.

Final request acceleration (t)=min (maximum request acceleration, request acceleration, final request acceleration (t−1)+change amount in maximum request acceleration*dt)

where t−1 is a final request acceleration at a previous time point, dt is a time interval at which a control amount at a next time point is calculated, and t is a time during which a current control amount is calculated.

The acceleration/deceleration control executing unit 314 outputs the final request acceleration determined by the determining unit 313 to the EMS 40 and controls acceleration and deceleration so as to maintain an appropriate distance from a preceding vehicle. In this case, the final request acceleration is assumed to have a positive value and is output to the EMS 40.

When the final request acceleration has a positive value, the acceleration/deceleration control executing unit 314 adjusts an engine output according to an engine torque generated corresponding to the final request acceleration. When the final request acceleration has a negative value, the acceleration/deceleration control executing unit 314 adjusts a braking force applied to wheels according to a braking torque generated corresponding to the final request acceleration The appropriate distance, the goal speed, and the like may be stored in the storing unit 315 by the driver. Furthermore, the storing unit 315 may store the goal speed that is changed according to a speed of a vehicle.

The LKAS 20 recognizes a lane and calculates an auxiliary steering torque so as to preventing departure from the recognized lane. The LKAS 20 provides the calculated auxiliary steering torque to a steering control apparatus that is an electric power steering 50. In particular, the LKAS 20 outputs the auxiliary steering torque as a command and performs control such that an actual torque of a steering apparatus is identical thereto.

A constant speed control method for an adaptive cruise control system interlocking with the LKAS having the above-mentioned configuration will be described with reference to FIG. 3.

Figure 3:
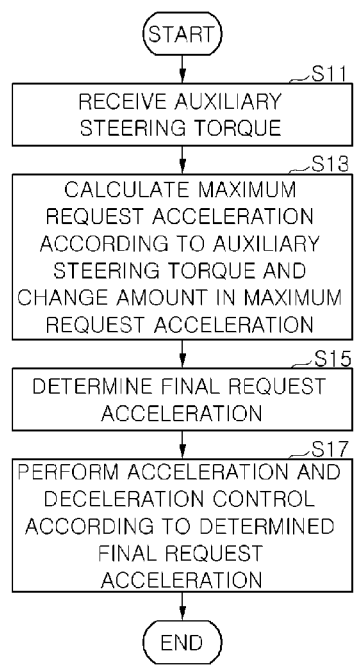
FIG. 3 is a flowchart explaining a constant speed control method for an adaptive cruise control system interlocking with an LKAS according to an exemplary embodiment of the present invention.

FIG. 3 is a flowchart explaining a constant speed control method for an adaptive cruise control system interlocking with an LKAS according to an exemplary embodiment of the present invention.

Referring to FIG. 3, an electronic control unit 31 receives an auxiliary steering torque generated from the LKAS 20 through the radar 10 (S11).

Figure 4:
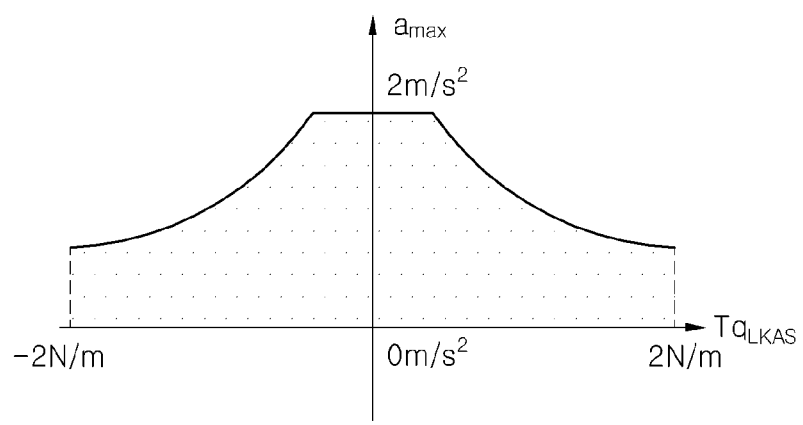
FIG. 4 is a graph illustrating a maximum request acceleration that is changed according to an auxiliary steering torque received from an LKAS.
Figure 5:
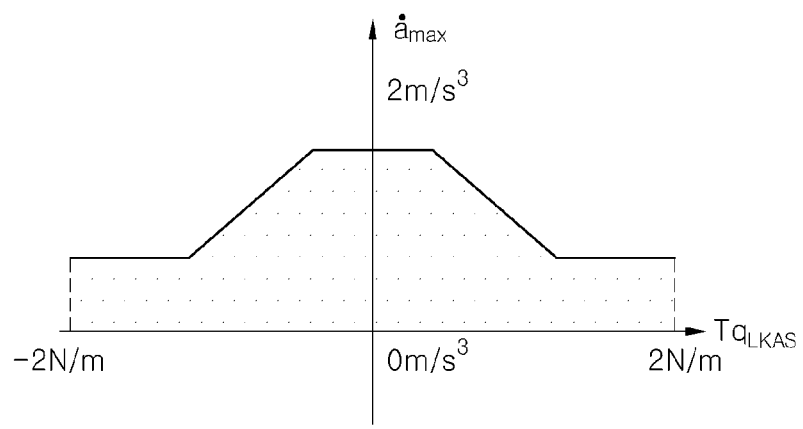
FIG. 5 is a graph illustrating a change mount in a maximum request acceleration that is changed according to an auxiliary steering torque received from an LKAS.

The electronic control unit 31 calculates a maximum request acceleration that is changed according to the received auxiliary steering torque and a change amount in the maximum request acceleration (S13). FIG. 4 is a graph illustrating a maximum request acceleration that is changed according to an auxiliary steering torque $Tq_{LKAS}$ and FIG. 5 is a graph illustrating a change mount in the maximum request acceleration that is changed according to the auxiliary steering torque $Tq_{LKAS}$. As shown in the graphs illustrated in FIGS. 4 and 5, the maximum request acceleration according to the auxiliary steering torque and the change mount in the maximum request acceleration may be determined The electronic control unit 31 determines a final request acceleration by using the maximum request acceleration to which the auxiliary steering torque is reflected, the change amount in the maximum request acceleration, and the request acceleration calculated to allow a vehicle to maintain an appropriate distance from a preceding vehicle ahead of the vehicle, that is the request acceleration calculated using a distance from the preceding vehicle, and a speed and acceleration from the preceding vehicle (S15).

Specifically, the electronic control unit 31 determines a maximum request acceleration that is changed according to the auxiliary steering torque received from the LKAS 20 by referring to maximum request accelerations determined for respective auxiliary steering torques as illustrated in the graph of FIG. 4, and determines a change amount in the maximum request acceleration that is changed according to the auxiliary steering torque received from the LKAS 20 by referring to change amounts in the maximum request accelerations determined for respective auxiliary steering torques as illustrated in the graph of FIG. 5.

A final request acceleration is determined by the maximum request acceleration and the change amount in the maximum request acceleration, from which it can be seen that the final request acceleration is changed according to the auxiliary steering torque. In this case, t−1 illustrated in FIG. 6 is a final request acceleration at a previous time point.

Figure 6:
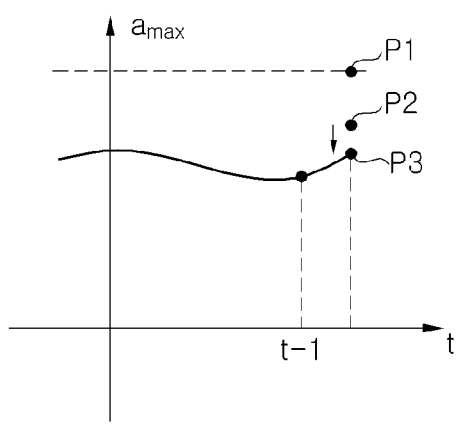
FIG. 6 is a graph illustrating a final request acceleration that is changed according to an auxiliary steering torque received from an LKAS.

That is, P1 in FIG. 6 is the maximum request acceleration determined according to the auxiliary steering torque received from the LKAS 20, P2 is the request acceleration for allowing a vehicle to maintain an appropriate distance from a preceding vehicle based on information on a host vehicle, and P3 is the final request acceleration of which the slope is adjusted by the change amount in the maximum request acceleration determined according to the auxiliary steering torque received from the LKAS 20. Therefore, the electronic control unit 31 performs acceleration/deceleration control according to the final request acceleration P3, and therefore, the amount or slope of the maximum request acceleration is reduced compared to an existing adaptive cruise control system (that is, acceleration/deceleration control according to a request acceleration such as P2), thereby allowing a driver to feel a sense of smooth acceleration.

As illustrated in FIG. 6, it can be seen that a slope from the final request acceleration at the previous time point t−1 to a final request acceleration P3 which is adjusted by the change amount in the maximum request acceleration in consideration of the auxiliary steering torque is smaller than a slope from the final request acceleration at the previous time point t−1 to a request acceleration P2 currently required to maintain an appropriate distance, and smother acceleration is archived than an existing adaptive cruise control system.

The electronic control unit 31 outputs the determined final request acceleration to perform acceleration/deceleration control according to the final request acceleration (S17). The electronic control unit 31 performs deceleration control when the final request acceleration has a negative value, and performs acceleration control when the final request acceleration has a positive value. Therefore, the electronic control unit 31 can perform control such that a vehicle is driven at a constant speed while maintaining an appropriate distance from the preceding vehicle.

Accordingly, the final request acceleration is determined by reflecting the auxiliary steering torque generated from the LKAS even when the LKAS and the ACC system are simultaneously driven, thereby reducing a sense of incompatibility which a driver feels and allowing the driver to feel a sense of smooth acceleration.

According to the exemplary embodiment of the present invention, it is possible to control acceleration and deceleration of a vehicle according to a final request acceleration determined based on a request acceleration to which an auxiliary steering torque received from the LKAS is reflected, a change amount in the request acceleration and a request acceleration calculated to maintain an appropriate distance from vehicles ahead, thereby reducing a sense of incompatibility of a driver and archiving comfortable driving.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 10: radar | 20: LKAS |
| 30: ESC | 31: electronic control unit |
| 311: receiving unit | 312: calculating unit |
| 313: determining unit | 314: acceleration/deceleration control executing unit |
| 315: storing unit | 40: EMS |
| 50: EPS | |

What is claimed is:

1. An adaptive cruise control system interlocking with a lane keeping assist system (LKAS), comprising
a radar that detects a preceding vehicle ahead and measure an inter-vehicle distance; and
an electronic control unit that controls acceleration and deceleration of a vehicle according to an initial request acceleration calculated to maintain an appropriate distance from the preceding vehicle, the initial request acceleration is requested by a driver,
wherein the electronic control unit calculates a maximum request acceleration that is changed according to an auxiliary steering torque received from the LKAS which prevents lane departure and a change amount in the maximum request acceleration, and controls acceleration and deceleration of the vehicle based on a final request acceleration determined by using the calculated maximum request acceleration, the calculated change amount in the maximum request acceleration, and the calculated request acceleration.

2. The adaptive cruise control system according to claim 1, wherein the electronic control unit comprises:
a receiving unit that receives the auxiliary steering torque generated from the LKAS;
a calculating unit that calculates the maximum request acceleration that is changed according to the auxiliary steering torque received from the receiving unit and the change amount in the maximum request acceleration;
a determining unit that determines the final request acceleration by using the initial request acceleration which is calculated to maintain an appropriate distance from the preceding vehicle and to reflect a goal speed of the driver, and the maximum request acceleration and the change amount in the maximum request acceleration which are calculated by the calculating unit; and
an acceleration/deceleration control executing unit that outputs a final request acceleration according to the final request acceleration determined by the determining unit and control acceleration and deceleration of the vehicle.

3. The adaptive cruise control system according to claim 2, wherein the final request acceleration is determined to a value obtained by adjusting the initial request acceleration by the change amount in the maximum request acceleration.

4. A constant speed control method for an adaptive cruise control system interlocking with a lane keeping assist system (LKAS), the adaptive cruise control system including a radar that detects a preceding vehicle ahead and measure an inter-vehicle distance and an electronic control unit that controls acceleration and deceleration of a vehicle according to an initial request acceleration calculated to maintain an appropriate distance from the preceding vehicle, the initial request acceleration is requested by a driver, the constant speed control method comprising:
receiving an auxiliary steering torque generated from the LKAS;
calculating a maximum request acceleration that is changed according to the auxiliary steering torque received from a receiving unit and a change amount in the maximum request acceleration; and
controlling acceleration and deceleration of the vehicle based on a final request acceleration determined by using the calculated maximum request acceleration, the calculated change amount in the maximum request acceleration, and the initial request acceleration calculated to maintain an appropriate distance from the preceding vehicle.

5. The adaptive cruise control system according to claim 4, wherein the controlling of the acceleration and deceleration of the vehicle comprises:
determining the final request acceleration by using the initial request acceleration which is calculated to maintain an appropriate distance from the preceding vehicle and to reflect a goal speed of the driver, the calculated maximum request acceleration and the calculated change amount in the maximum request acceleration; and
outputting a final request acceleration according to the determined final request acceleration determined and controlling acceleration and deceleration of the vehicle.

* * * * *